United States Patent Office 3,572,994
Patented Mar. 30, 1971

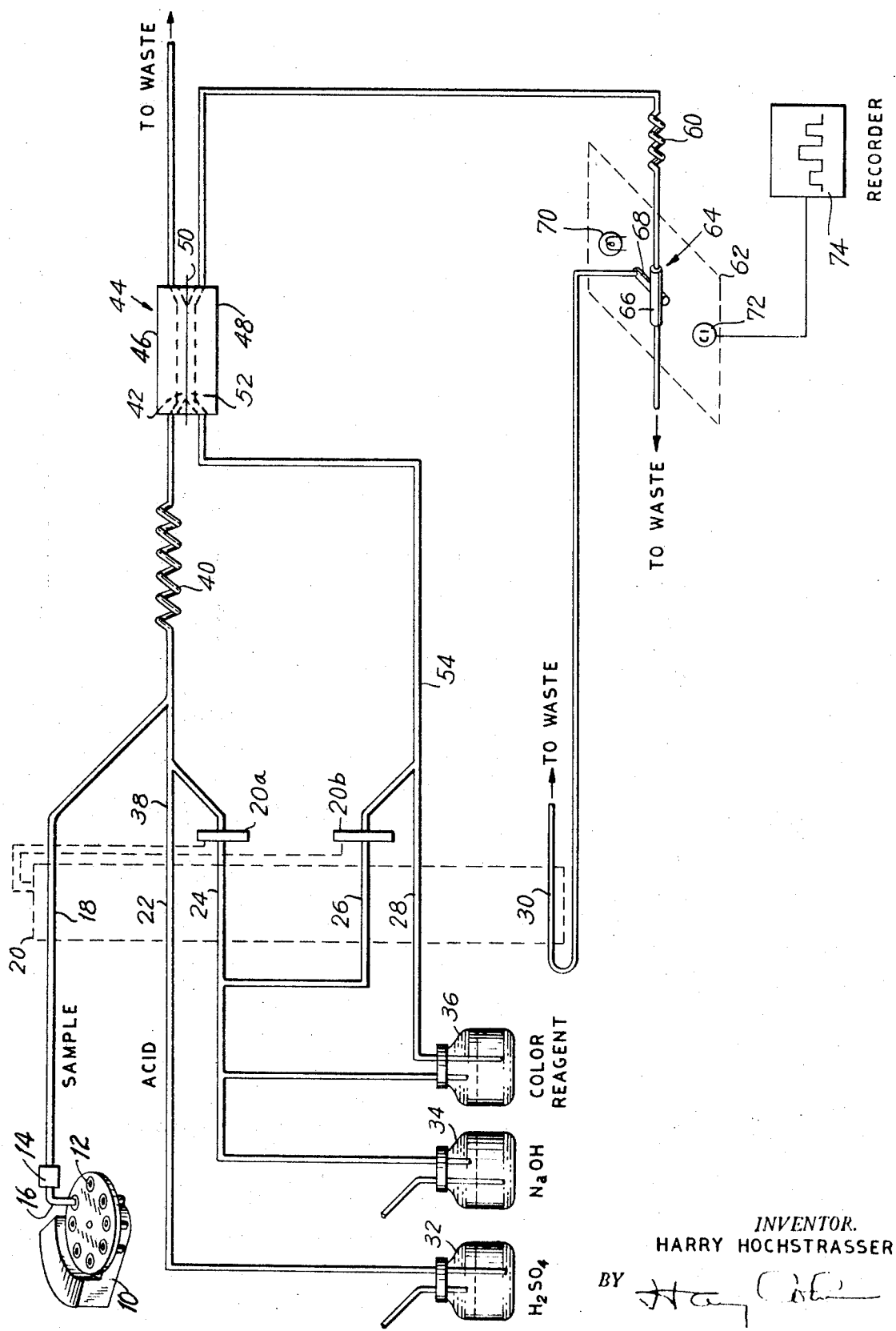

3,572,994
ANALYSIS SYSTEM FOR A LIQUID STREAM FOR A GASEOUS CONSTITUENT
Harry Hochstrasser, Hastings-on-Hudson, N.Y., assignor to Technicon Corporation, Ardsley, N.Y.
Filed Feb. 27, 1968, Ser. No. 708,699
Int. Cl. G01n 21/12
U.S. Cl. 23—230        9 Claims

ABSTRACT OF THE DISCLOSURE

A system for the analysis of a stream of liquid samples for carbon dioxide content includes a sampler, proportioning pump, a gas-permeable and liquid-impermeable membrane for passing carbon dioxide from the sample stream to a reagent stream, a colorimeter for examining the reagent stream and a recorder.

BACKGROUND OF THE INVENTION

(1) Field of the invention

This invention relates to the analysis of a material for a particular gaseous ingredient, and particularly to the continuous quantitative analysis of a liquid stream for carbon dioxide.

(2) Prior art

Systems for the continuous quantitative analysis of a liquid stream for carbon dioxide have been taught by L. T. Skeggs in U.S. Pat. No. 2,946,665, issued July 26, 1960; L. T. Skeggs in U.S. Pat. No. 2,967,764, issued Jan. 10, 1961; and W. J. Smythe in U.S. Pat. No. 3,342,019, issued Sept. 19, 1967. In these apparatuses a plurality of unique liquid samples, flowing as serial segments in a stream spaced apart by segments of an inert, immiscible gas, are individually and serially treated and analyzed for carbon dioxide content, and a record made of the measurement, according to the principles set out by L. T. Skeggs in U.S. Pat. No. 2,797,149, issued June 25, 1957.

In U.S. Pats. Nos. 2,967,764 and 3,342,019, supra, the liquid samples are treated in transit with a weak acid to release carbon dioxide therefrom, and are discharged into a trap which separates the gaseous carbon dioxide from the liquid sample remainder. The gas is aspirated into a conduit and added to a stream of reagent to form a stream whose optical density at a particular wavelength becomes responsive to the quantity of carbon dioxide added thereto. The optical density is measured in a colorimeter, and the value is recorded. While these traps are well suited to their purpose, they impose a limit on the rate at which samples can be passed therethrough with acceptable minimum contamination of a succeeding liquid sample by a preceding sample.

SUMMARY OF THE INVENTION

Accordingly, it is an object of this invention to provide an improved system for the separation and detection of a particular gas, especially carbon dioxide, from a stream of liquid samples, which minimizes the contamination of a succeeding sample by a preceding sample.

A feature of this invention is the provision in an automatic analytic system for the determination of a gaseous constituent of interest, such as carbon dioxide, in a flowing stream of successive liquid sample segments, which are spaced apart by intermediate segments of a fluid immiscible therewith, and which sample segments contain the gaseous constituent in free form, of a semipermeable membrane, which is gas-permeable and liquid-impermeable and is adapted to permit the passage therethrough of at least a portion of said gaseous constituent into a recipient stream of liquid, and to preclude the passage therethrough of the sample or recipient liquids. Advantageously, the recipient stream is similarly formed of segments of recipient liquid, which are spaced apart by intermediate segments of a fluid immiscible therewith, and is in direct phase with the sample stream.

BRIEF DESCRIPTION OF THE DRAWING

These and other objects, features and advantages of the invention, will be apparent from the following specification thereof, taken in conjunction with the accompanying drawing in which:

The figure is a schematic diagram of an embodiment of this invention.

DESCRIPTION OF THE INVENTION

As shown in the drawing, a sampler 10, which may be of the type shown by J. Isreeli et al. in U.S. Pat. No. 3,230,776, issued Jan. 25, 1966, supports a plurality of sample containers 12 and sequentially and intermittently presents each container in turn to an off-take device 14 having an off-take tube 16. One end of the off-take tube is inserted into the presented thereto container for the aspiration of the sample liquid therefrom. The other end of the off-take tube is coupled to the inlet of a pump tube 18 in a peristaltic type pump 20, which may be of the type shown by W. J. Smythe in U.S. Pat. No. 3,306,229, issued Feb. 28, 1967. The pump also includes pump tubes 22, 24, 26, 28 and 30. These pump tubes are occluded progressively along their lengths by a plurality of rollers to advance fluids therethrough. The inlet of the pump tube 22 is coupled to a source 32 of mild acid, such as 0.25 N sulfuric acid. The inlet of the pump tube 24 is coupled to a source 34 of carbon-dioxide-free air, such as a trap containing 1 NaOH. The outlet end of this tube is normally closed by a pinch bar 20a, as shown in U.S. Pat. No. 3,306,229, supra. The inlet of the pump tube 26 is also coupled to the source of carbon-dioxide-free air, and its outlet is also normally closed by a pinch bar 20b. The inlet of the pump tube 28 is coupled to source 36 of a carbon dioxide sensitive color reagent, such as a dilute solution of Cresol Red indicator dye weakly buffered at pH 9.2 by tris(hydroxymethyl)aminomethane and ammonium hydroxide. The inlet of the source 36 is coupled to the source of carbon-dioxide-free air 34.

The outlet of the pump tube 24 is coupled to a conduit 38 which is coupled to the outlet of the pump tube 22, so that, when the pinch bar 20a is periodically released, a segment of carbon-dioxide-free air is injected into the stream of diluent-acid. The outlet of pump tube 18 is coupled to the conduit 38 further downstream so that the sample liquid is added to the segments of diluent-acid in the stream. The conduit 38 is coupled to the inlet of a mixing coil 40, such as is shown by A. Ferrari, Jr. in U.S. Pat. No. 2,933,293, issued Apr. 19, 1960, wherein the segments of diluent-acid plus sample liquid are uniformly intramixed, liberating carbon dioxide from the acidified solution, which is carried along with the respective liquid segment. The outlet of the mixing coil is coupled to the inlet of the donor stream passageway 42 of a gas separator assembly 44, whose outlet discharges to waste.

The gas separator assembly 44 may be similar in construction to the dialyzer assembly shown by J. Israeeli in U.S. Pat. No. 3,333,706, issued Aug. 1, 1967. Essentially, it includes two plates 46 and 48 clamped onto a semipermeable membrane 50 which is gas-permeable and liquid-impermeable. The plates have mating, confronting grooves, separated by the membrane, providing the donor stream passageway 42 and a donee stream passageway 52.

The outlet of the pump tube 26 is coupled to a conduit 54 which is coupled to the source of color reagent 36, so that, when the pinch bar 20b is periodically released, a segment of carbon-dioxide-free air is injected into the stream of color reagent. The conduit 54 is coupled to the inlet of the donee passageway 52. The conduit lengths and diameters are selected so that the respective segmented streams to the donor and donee passageways are mutually directly in phase with respect to their length and timing of segmentation.

Some of the carbon dioxide gas which was present in the sample segments as a bicarbonate diffuses through the membrane into the color-reagent stream, changing its pH slightly and causing an increase in its optical density. The actual amount of carbon dioxide that thus diffuses is proportional to the amount present in the original sample. The resulting change in optical density may be compared to the change produced when standard solutions of known carbon dioxide content are introduced into one system, and on the basis of this comparison, the carbon dioxide content of the sample liquid may be determined. To measure the optical density, the outlet of the donee passageway is coupled through a mixing coil 60 to a colorimeter 62. The colorimeter may be of the type shown by L. T. Skeggs in U.S. patent application Ser. No. 556,749, filed June 10, 1966 now U.S. Pat. No. 3,518,008. A flow cell 64 has an upper passageway 66 having an inlet coupled to the mixing coil 60, and an outlet which is coupled to waste; and has a lower sight passageway 68 having an upper inlet which merges with an intermediate, lower outlet in the passageway 66 and an outlet which is coupled to the inlet of the pump tube 30, which discharges to waste. The pump tube 30 draws a stream of color-reagent plus carbon dioxide, without gas segments, through the sight passageway. The colorimeter includes the customary light source 70, filters (not shown), and light detector 72, which detector is coupled to a recorder 74. The colorimeter-recorder system may be of the type shown by M. H. Pelavin in U.S. Pat. No. 3,236,148, issued Feb. 22, 1966.

I have found that a membrane cut from polyethylene film, about 0.0005 inch thick, gives satisfactory performance. A membrane cut from polyethylene film, about 0.00035 inch thick, gives better performance. Membranes of latex rubber are usable, but not as good as polyethylene. Membranes of silicone rubber, about 0.002 inch thick, pass carbon dioxide about six times as fast as the 0.0035 inch polyethylene, but, apparently due to the extra thickness, the washout characteristic, is not as good as for the thinner film.

The use of the membrane to separate the released carbon dioxide from the sample liquid, provides several benefits over the prior "trap" system. The "trap" requires at least an additional pump tube to repump the gas from the trap. The elimination of gas repumping results in a liquid washing out of the successive pockets of carbon dioxide arising from the successive liquid samples being introduced into the system which is much more efficient than the prior art gas flushing. The immedaite practical result is that precise analyses may be made at a faster rate than was previously possible. A second advantage is that the presence of an anti-foam reagent in the acid diluent, taught by the prior art, is no longer necessary. In practice this results in improved operation because generally the anti-foam reagent was not a uniform solution or suspension and had a tendency to clog narrow conduits. As a result, in a commercial embodiment, the sample analysis rate has been increased from thirty to sixty sample per hour.

It will be appreacited that the semi-permeable membrane system may be extended to other analyses, such as for ammonia, from highly alkaline solutions, through a membrane, into an acidic absorbing solution.

While I have shown and described the preferred embodiment of the invention, it will be understood that the invention may be embodied otherwise than as herein specifically illustrated or described, and that certain changes in the form and arrangement of parts and in the specific manner of practising the invention may be made without departing from the underlying idea or principles of this invention within the scope of the appended claims.

What is claimed is:

1. A process for the quantitative analysis of a gaseous constituent of interest in a first flowing stream of successive liquid sample segments, which are spaced apart by intermedaite segments of a gas substantially immiscible therewith, and which sample segments contain the gaseous constituent in free form, including reacting said sample segments to provide said gaseous constituent in free form;

providing a second flowing stream of segments of a second liquid, which are spaced apart by intermediate segments of a gas substantially immiscible therewith, and which second liquid has an optical density which is variable and responsive to the quantity of the gaseous constituent of interest added to such liquid;

passing the first stream along one face of semi-permeable membrane and passing the second stream along the other face of the membrane;

the membrane being permeable to the gaseous constituent of interest and impermeable to the liquids of the first and second streams, whereby a respective portion of the gaseous constituent of interest carried by each first stream liquid sample segment passes through the membrane into a respective second stream liquid segment; and measuring the optical density of the second stream liquid segments after the addition thereto of the gaseous constituent.

2. A process according to claim 1 wherein the gaseous constituent is carbon dioxide, and the immiscible fluid is a carbon-dioxide-free gas.

3. Apparatus for the quantitative analysis of a gaseous constituent of interest in a first flowing stream of successive liquid sample segments which are spaced apart by intermediate segments of a gas substantially immiscible therewith, and which sample segments contain the gaseous constituent in free form, comprising:

first means for transmitting said first stream, said first means including means for reacting said liquid sample segments to provide said gaseous constituent in free form;

second means for providing a second flowing stream of segments of a second liquid, which are spaced apart by intermediate segments of a gas substantially immiscible therewith, and which second liquid has an optical density which is variable and responsive to the quantity of the gaseous constituent of interest added to such liquid;

a semi-permeable membrane which is permeable to the gaseous constituent of interest and impermeable to the liquids of the first and second streams;

third means, coupled to said first and second means, for supporting said membrane, and for directing said first stream along a path along one side of said membrane and for directing said second stream along the other side of said membrane, whereby a respective portion of the gaseous constituent of interest carried by each first stream liquid sample segment passes through the membrane into a respective second stream liquid segment; and fourth means, coupled to said third means, for measuring the optical density of the second stream liquid segments after the addition thereto of the gaseous constituent.

4. Apparatus according to claim 3 wherein said third means comprises a pair of plates, clamped onto said semipermeable membrane, and each having a respective, mating, confronting groove, separated from the other by said membrane, and providing a conduit for a respective stream.

5. Apparatus according to claim 3 wherein said membrane is formed of a thin sheet of polyethylene.

6. Apparatus according to claim 3 wherein said membrane is formed of a thin sheet of silicone rubber.

7. Apparatus according to claim 3 wherein said first and second streams are transmitted by pump and valve means, having a first periodically operated valve means for periodically introducing said gas segments into said first stream and a second periodically operated valve means for periodically introducing said gas segments into said second stream.

8. A process for the quantitative analysis of a gaseous constituent of interest in a first flowing stream of successive liquid sample segments, which are spaced apart by intermediate segments of a gas substantially immiscible therewith, and which sample segments contain the gaseous constituent in free form, including reacting said sample segments to provide said gaseous constituent in free form;

providing a second flowing stream of a second liquid, which second liquid has an optical density which is variable and responsive to the quantity of the gaseous constituent added to such liquid;

passing the first stream along one face of semipermeable membrane and passing the second stream along the other face of the membrane;

the membrane being permeable to the gaseous constituent of interest and impermeable to the liquids of the first and second streams, whereby a respective portion of the gaseous constituent of interest carried by each first stream liquid sample segment passes through the membrane into the second stream liquid; and measuring the optical density of the second stream liquid after the addition thereto of the gaseous constituent.

9. Apparatus for the quantitative analysis of a gaseous constituent of interest in a first flowing stream of successive liquid sample segments which are spaced apart by intermediate segments of a gas substantially immiscible therewith, and which sample segments contain the gaseous constituent in free form, comprising:

first means for transmitting said first stream, said first means including means for reacting said liquid sample segments to provide said gaseous constituent in free form;

second means for providing a second flowing stream of a second liquid, which second liquid has an optical density which is variable and responsive to the quantity of the gaseous constituent of interest added to such liquid;

a semi-permeable membrane which is permeable to the gaseous constituent of interest and impermeable to the liquids of the first and second streams;

third means, coupled to said first and second means, for supporting said membrane, and for directing said first stream along a path along one side of said membrane and for directing said second stream along the other side of said membrane, whereby a respective portion of the gaseous constituent of interest carried by each first stream liquid sample segment passes through the membrane into the second stream liquid; and fourth means, coupled to said third means, for measuring the optical density of the second stream liquid after the addition thereto of the gaseous constituent.

References Cited

UNITED STATES PATENTS

| | | | |
|---|---|---|---|
| 3,333,706 | 7/1967 | Isreeli | 210—321 |
| 3,404,962 | 10/1968 | Medlar et al. | 23—254X |

MORRIS O. WOLK, Primary Examiner

R. E. SERWIN, Assistant Examiner

U.S. Cl. X.R.

23—232, 253, 254; 210—321; 356—72, 181